(12) United States Patent
Huppertz

(10) Patent No.: US 8,692,199 B2
(45) Date of Patent: Apr. 8, 2014

(54) CONCEPT FOR DETERMINING A MEASUREMENT VALUE AT A COMPONENT

(75) Inventor: Juergen Huppertz, Dulsburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 714 days.

(21) Appl. No.: 12/277,479

(22) Filed: Nov. 25, 2008

(65) Prior Publication Data

US 2009/0134330 A1    May 28, 2009

(30) Foreign Application Priority Data

Nov. 26, 2007  (DE) .......................... 10 2007 056 731

(51) Int. Cl.
*G01J 5/22* (2006.01)
(52) U.S. Cl.
USPC ................... 250/338.1; 250/336.1; 324/76.11
(58) Field of Classification Search
USPC .......................... 250/336.1, 338.1; 324/76.11
See application file for complete search history.

(56) References Cited

U.S. PATENT DOCUMENTS

| | | | | |
|---|---|---|---|---|
| 5,420,419 A * | 5/1995 | Wood | | 250/338.4 |
| 5,646,622 A | 7/1997 | Kuttner | | |
| 5,756,999 A * | 5/1998 | Parrish et al. | | 250/332 |
| 5,811,808 A * | 9/1998 | Cannata et al. | | 250/332 |
| 5,844,514 A | 12/1998 | Ringh et al. | | |
| 6,023,061 A * | 2/2000 | Bodkin | | 250/332 |
| 6,028,309 A * | 2/2000 | Parrish et al. | | 250/332 |
| 6,243,034 B1 * | 6/2001 | Regier | | 341/166 |
| 6,433,333 B1 * | 8/2002 | Howard | | 250/252.1 |
| 6,465,785 B1 * | 10/2002 | McManus | | 250/338.1 |
| 6,486,811 B2 | 11/2002 | Clara et al. | | |
| 6,515,285 B1 * | 2/2003 | Marshall et al. | | 250/352 |
| 6,556,158 B2 * | 4/2003 | Steensgaard-Madsen | | 341/131 |
| 6,683,310 B2 * | 1/2004 | Wood | | 250/338.1 |
| 6,690,013 B2 * | 2/2004 | McManus | | 250/338.1 |
| 6,784,820 B1 * | 8/2004 | Casalegno et al. | | 341/155 |
| 6,791,085 B2 * | 9/2004 | Martin et al. | | 250/338.1 |
| 6,812,465 B2 * | 11/2004 | Parrish et al. | | 250/338.1 |
| 7,002,417 B2 * | 2/2006 | Maunuksela et al. | | 331/17 |
| 7,030,378 B2 * | 4/2006 | Allen et al. | | 250/332 |
| 7,105,818 B2 * | 9/2006 | Anderson et al. | | 250/338.1 |
| 7,132,648 B2 * | 11/2006 | Ratiff et al. | | 250/252.1 |

(Continued)

FOREIGN PATENT DOCUMENTS

| | | |
|---|---|---|
| DD | 288 046 A5 | 3/1991 |
| DE | 2 209 413 A | 9/1973 |
| DE | 3836823 A1 | 5/1990 |

OTHER PUBLICATIONS

Huppertz; "Apparatus and Method for Efficient Analog-To-Digital Conversion"; U.S. Appl. No. 12/277,492, filed Nov. 25, 2008.

(Continued)

*Primary Examiner* — David Porta
*Assistant Examiner* — Djura Malevic
(74) *Attorney, Agent, or Firm* — Keating & Bennett, LLP

(57) ABSTRACT

In an evaluation device for determining a measurement value at a component, power is supplied to the component during readout of the measurement value. A controller serves to determine the power supplied to the component during the readout. The measurement value determined by the reader is corrected by a compensator while using the power determined by the controller, so as to obtain a corrected measurement value freed from any effects caused by the power supplied.

26 Claims, 7 Drawing Sheets

(56) References Cited

U.S. PATENT DOCUMENTS

| | | | |
|---|---|---|---|
| 7,221,302 B1 | 5/2007 | Melanson | |
| 7,289,054 B1* | 10/2007 | Watanabe | 341/156 |
| 7,335,884 B2* | 2/2008 | Lee et al. | 250/339.02 |
| 7,365,667 B1* | 4/2008 | Nanda et al. | 341/143 |
| 7,616,142 B1* | 11/2009 | Mai | 341/143 |
| 7,786,912 B2* | 8/2010 | Rangan et al. | 341/143 |
| 7,880,777 B2* | 2/2011 | Anderson | 348/241 |
| 2002/0166968 A1* | 11/2002 | Bradley | 250/338.1 |
| 2003/0042421 A1* | 3/2003 | Oda | 250/352 |
| 2003/0213910 A1* | 11/2003 | Anderson et al. | 250/338.1 |
| 2006/0231760 A1* | 10/2006 | Lee et al. | 250/338.1 |
| 2009/0014653 A1* | 1/2009 | Parrish | 250/338.1 |

OTHER PUBLICATIONS

Official Communication issued in corresponding U.S. Appl. No. 12/277,492, mailed on Feb. 23, 2010.

English translation of the official communication issued in counterpart German Application No. 10 2007 056 732.6, mailed on Sep. 23, 2008.

Nowicki: "Kalorimeter Zur Absoluten Leistungsmessung Stetiger Laserstrahlung," Electronic Letters 1967; vol. 3, No. 11; Sep. 25, 1967; pp. 474-475.

English translation of the official communication issued in counterpart German Application No. 10 2007 056 731.8, mailed on Jul. 30, 2008.

* cited by examiner

CONCEPT FOR DETERMINING A MEASUREMENT VALUE AT A COMPONENT

CROSS-REFERENCE TO RELATED APPLICATIONS

This application claims priority from German Patent Application No. 102007056731.8, which was filed on Nov. 26, 2007, and is incorporated herein in its entirety by reference.

Some embodiments of the present invention relate to an evaluation device for determining a measurement value at a component, and in particular to how a change—caused by a feedback of the determination of the measurement value at the component—in parameters or physical properties of the component may be compensated for.

BACKGROUND OF THE INVENTION

In a plurality of practical applications of measurement or sensor technology it is useful to precisely determine a small variable signal portion, since a measurement quantity or an environmental influence to be determined causes only a small change in a physical property of the sensor, or the component, said physical property being accessible to measurement. The measurement quantity detected by an evaluation device at the component or the sensor may also be changed in an undesired manner by further external environmental influences, so that the measurement value will be distorted. This may be caused, for example, by variation in ambient pressure and temperature, as long as these are not the physical measurement quantities to be detected by the component or sensor.

The smaller a desired change in the measurement quantity of the component which is caused by the physical measurement quantity to be determined, the more severe the impact that the above-mentioned additional changes or interferences of this measurement quantity may have on the measurement result. This may even cause the measurement result to be distorted to such an extent that it is no longer meaningful.

A bolometer and the evaluation device or evaluation electronics used for reading out a bolometer may serve as examples. A bolometer serves to measure temperature and/or to measure intensity of radiation in that electromagnetic waves are absorbed within the bolometer. As a result, the temperature of the bolometer increases, the temperature change triggered by the incident heat radiation being very small. Sometimes, temperature differences of less than 1 mK may be resolved. The temperature is determined by a temperature-dependent, electrically functional component and is converted to an electrical signal. As an example of a simple bolometer, an electrical conductor mounted within a vacuum may be mentioned which undergoes a change in resistance as the temperature changes, which change in resistance in turn may be determined by detecting a current which flows through the wire at a constant voltage. In this example as well as in alternative evaluation devices for reading out the bolometer, electrical power dissipation arises within the read-out bolometer itself. Said power dissipation varies depending on the operating state of the bolometer and is caused by the component used for the readout itself.

What is problematic is that in the bolometers used as examples, the warming-up caused by this power dissipation itself cannot be distinguished from that caused by the electromagnetic radiation (infrared radiation) to be detected. Since with bolometers, the temperature change caused by the power dissipation is typically clearly larger than that of the signal to be measured, i.e. than that caused by the electromagnetic radiation absorbed, countermeasures should be taken with the objective of obtaining a meaningful readout. Compensation for this effect could be achieved, for example, by periodic recalibration as is achieved, for example, by using a shutter in infrared cameras. In this context, the camera is shielded off from the radiation influences by means of the shutter, so that in this shielded-off state of the sensor element, said sensor element may be recalibrated. However, during this time the camera is blind and cannot take any pictures. A further possibility would consist in specifying the operating parameters of the sensor or component in great detail while taking into account the power dissipation introduced by the readout. Before the measurement values determined are deemed meaningful, one could wait until a stationary state is achieved, i.e. until the long-term time average of the operating parameters is reached. This stationary state could also be reached by external control involving a large amount of effort. For a bolometer, this would mean, for example, to keep the temperature of the substrate constant, which may be achieved, for example, by means of a thermoelectric cooling module (a Peltier element) or the like. The control associated therewith entails a large amount of effort. Alternatively, the temperature of the substrate could be measured, and the measurement value could be corrected using many calibration points which have been detected for different temperatures. This, too, entails a very large amount of effort, and, additionally, does not result in full compensation being achieved, since the individual structural elements, which are manufactured micromechanically in most cases, exhibit considerable variations with regard to their parameters.

Deviation between individual sensors may further lead to secondary effects, since, for example with the above-described resistance bolometers, a differing resistance or a differing temperature coefficient directly influences not only the output signal, but also the level of the power dissipation generated by the evaluation device within the sensor, and thus, in turn, indirectly influences the output signal.

Even though the above as well as the following discussions mainly relate to electronic evaluation devices, similar problems of the feedback of evaluation devices onto the readout result also arise with mechanical systems, for example. For example, if the amplitude of oscillation of an oscillation system is to be determined mechanically, the mechanical coupling of the evaluation device the system to be determined will inevitably result in power being supplied to or withdrawn from the system, which in turn will distort the readout result.

There is thus a need to provide evaluation devices which enable more reliable determination of a measurement value at a component.

SUMMARY

According to an embodiment, an evaluation device for determining a measurement value of a component connected to the evaluation device may have: a reader configured to determine the measurement value while supplying power to the component; and a controller for determining the power supplied by the reader; and a compensator so as to correct the measurement value determined by the reader while using the power determined by the controller in order to obtain a corrected measurement value which is freed from any effects caused by the power supplied.

According to another embodiment, a method of determining a measurement value at a component may have the steps of: reading out the measurement value of the component while supplying power to the component; and determining the power supplied to the component during the readout; and correcting the read-out measurement value while using the power determined, so as to obtain a corrected measurement value freed from any effects caused by the power supplied.

According to another embodiment, a bolometer may have: a bolometer element including an electrical resistance which changes upon incidence of electromagnetic radiation; and an evaluation device for determining a measurement value of a component connected to the evaluation device, including: a reader configured to determine the measurement value while supplying power to the component; and a controller for determining the power supplied by the reader; and a compensator so as to correct the measurement value determined by the reader while using the power determined by the controller in order to obtain a corrected measurement value which is freed from any effects caused by the power supplied; the reader being configured to determine, as the measurement value, the resistance through the bolometer element.

According to another embodiment, a bolometer system may have: a first bolometer element including an electrical resistance which changes upon incidence of electromagnetic radiation; a second bolometer element including an electrical resistance which changes upon incidence of electromagnetic radiation; an evaluation device configured to determine the electrical resistances of the first bolometer element and of the second bolometer element, the evaluation device including: a reader configured to determine the electrical resistance while supplying power to the first bolometer element and to the second bolometer element; a controller for determining the power supplied by the reader; and a compensator so as to correct the resistance, which is determined by the reader while using the power determined by the controller in each case in order to obtain first and second corrected measurement values which are freed from any effects caused by the power supplied.

In one embodiment of an evaluation device suited to determine a measurement value of a component, use is made of a readout means so as to determine the measurement value while supplying power to the component. The evaluation device further comprises a control means which enables determining the power supplied to the component by the readout means. As a result, if the power supplied is known, its effect on the measurement value itself may be estimated and corrected accordingly. In some embodiments, this estimation is based on a physical model of the component, and in particular of those elements of the component or sensor which are used for converting the observed physical measurement quantity to an electrical measurement value.

In further embodiments, the power supplied by the measurement is determined to be compensated for, for example, in a suitable computational manner later on. Additionally, the control means is employed to control the readout means such that the power supplied to the component during the readout corresponds to a predetermined standard value. In some embodiments of the invention this may be used, for example, when a multitude of sensors having identical actions are read out and when their readout results are to be compared to one another once the readout has been performed. If, in such a system, the measurement value to be achieved is based essentially on a relative value of different sensors which are read out at the same time or more or less around the same time, feedback onto the components or sensor elements may be prevented. This may be achieved, for example, if all sensor elements are supplied with an identical amount of power during the readout, so that the effect caused by the power is identical in all sensors.

In some embodiments, a delta-sigma modulator is used for measuring a current as the measurement value of a component which is to be determined. In this context, a power supplied to the component may be determined in a simple manner. Since with the modulation principle, a constant amount of charge flowing through the component is taken into account for each clock cycle, the power supplied or an energy supplied in total may be determined if the number of charge transfers taking place during a measurement cycle is known. This is made possible, in particular, in that the data within the feedback loop of the delta-sigma modulator is evaluated. During each clock, a charge flows into or out of a summation node of the delta-sigma modulator as a function of the signal of the feedback loop. The amount of charge flowing through the component within a measurement cycle may be determined from the sum of the charge while taking into account the direction of the charge transfer.

In some embodiments, a bolometer is read out by means of a delta-sigma modulator, or the current flowing through the bolometer is determined by means of a delta-sigma modulator. As a result, the power dissipation caused by the readout means within the bolometer may be taken into account or compensated for in a most simple manner.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
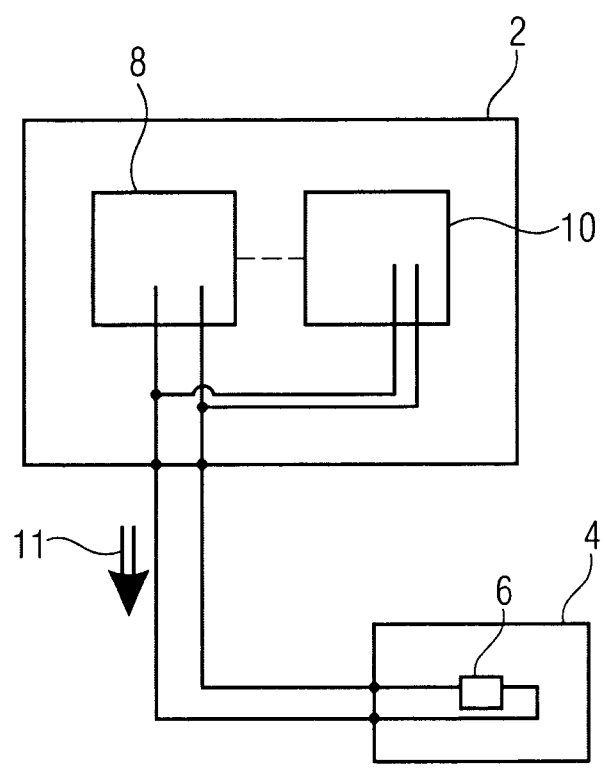
FIG. 1 shows an embodiment of an evaluation device.

FIG. 1 shows an evaluation device 2 for determining a measurement value at a component 4 connected to the evaluation device 2. The component 4 here is depicted merely for reasons of illustration. In principle, the evaluation device 2, or the embodiment of an evaluation device which is shown in FIG. 1, may be connected to any other components. Due to the flexible nature of the concept, application of the evaluation device is not limited to determining a specific physical measurement quantity such as the current or a voltage. Rather, embodiments of evaluation devices may be configured to determine most varied measurement quantities such as current, voltage, a resistance, or a force, friction, or any other mechanical quantity.

In the fundamental representation shown in FIG. 1, a measurement value generator 6, which generates the measurement value to be determined by the evaluation device 2, is mounted within the component 4. This measurement value may be, for example, a current generated by the measurement value generator 6, a voltage generated, a resistance through the measurement value generator 6, or any other characteristic. This may also be, e.g., a mechanical property such as the amplitude of an oscillating mechanical system. The evaluation device 2 comprises a readout means 8 as well as a control means 10. The readout means 8 serves to determine the measurement value of the component 4, the readout means 8 itself supplying or impressing power onto the component 4, as is graphically shown by the direction of power 11.

The control means 10 is also coupled to a connection between the readout means 8 and the component 4. The control means 10 determines the power supplied to the component 4 by the readout means 8.

Since the power supplied by the readout means 8 is determined, same may be used, for example, for correcting a readout result of the measurement value, provided that the latter is influenced by the very power supplied. For example, during readout of a resistance bolometer, a resistive element may be influenced or changed in that the power dissipation developing across the resistive element additionally changes the resistance of the resistive element (typically increases it because of the additional warming-up caused by the dissipation heat).

A similar effect can be observed, for example, with strain gages, wherein a change in the resistance of the material is caused by mechanical strain. However, as a result of the readout, additional electric power is deposited in the strain gages, which likewise result in the strain gage warming up, and, consequently, in the electric resistance thereof changing. In this example, too, it is not possible, without a control means 10 as is depicted in the embodiment shown in FIG. 1, to distinguish the signal to be actually measured from the resistance change caused by the evaluation device. Depending on the equipment, or depending on the evaluation device 2, the control means 10 may determine or monitor different physical measurement quantities in order to determine the power supplied by the readout means 8. With a supplied electric power, for example when the readout means 8 determines the measurement value at a constant voltage applied, the control means 10 may be implemented to determine the current flowing through the component 4. If the readout means 8 determines the measurement value at a constant current impressed, the control means 10 may determine the variable voltage present at the component 4 so as to determine the power supplied by the readout means 8.

If it is not possible to determine the measurement value while keeping an electrical quantity constant, the control means 10 may alternatively determine both relevant quantities, i.e. the voltage and the current, so as to determine the energy deposited within the component 4, for example by integrating the product of the two quantities.

In systems wherein the power supplied by the evaluation device causes a change in a physical property of the sensor which is associated with the measurement quantity of the sensor, said change being clearly larger than the maximum change being caused by a change in the quantity to be measured by the sensor, it is only by embodiments of evaluation devices that meaningful measurement may actually be enabled.

Figure 2A:
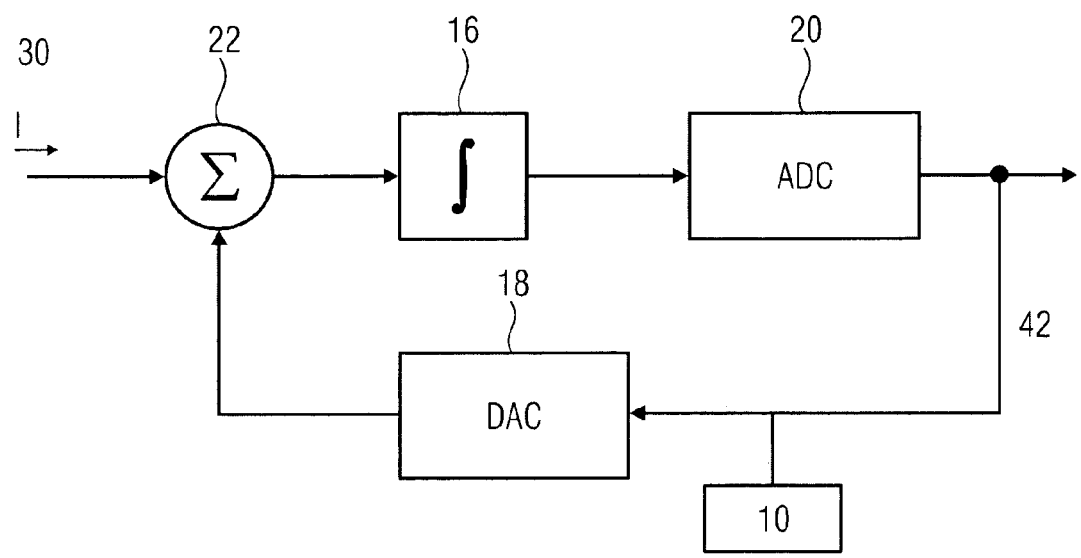
FIGS. 2A and 2B show a further embodiment of an evaluation device.

One example of such a system is an evaluation device for reading out a current flowing through a resistance bolometer, said evaluation device being based on the delta-sigma modulation principle as is shown in FIG. 2a in general terms at first. A delta-sigma modulator comprises an integrator 16, an ADC 20, a DAC 18, and an adder 22. What is determined is a signal 30 at the input of the delta-sigma modulator.

An output of the integrator 16 is connected to an input of the analog/digital converter 20, which compares the signal present at the output of the integrator 16 to a zero signal, and outputs, at its output, for example a zero bit or a one bit, depending on the comparison, during each cycle of the delta-sigma arrangement operated in a clocked manner.

The bit current made available, at the operating clock, at the output of the ADC 20 is processed further, one the one hand, as a readout result, and on the other hand serves to control the DAC 18 such that if the signal present at the input of the ADC 20 is larger than zero, a negative signal will be switched to the adder 22, so that the signal present at the input of the ADC 20 decreases with each operating clock. If the signal falls below the value of 0, the ADC 20 will switch over, that is it will output a different bit at its output, which again will result, via the DAC 18, in that a positive signal will be added to the input signal from this moment onward. This means that for each clock cycle, signals of constant absolute magnitudes are added to or subtracted from the signal 30 to be determined, so that the signal present at the input of the input of the ADC amounts to 0 on average. Charge packets of constant absolute magnitudes are added to or subtracted from the current 28, so that the net input current present at the input of the ADC amounts to 0 on average.

If for example the current flowing through a bolometer is measured as the signal by means of a delta-sigma modulator, the energy supplied to the bolometer may be determined, in addition to the measurement result, in that the data of the feedback loop 42 is evaluated. In each clock cycle, a charge will then flow into or out of the summation node 22 as a function of the signal of the feedback loop 42. The amount of charge flowing through the component during one measurement cycle may be determined from the sum of the charges while taking into account the direction of the charge transfer.

Figure 2B:
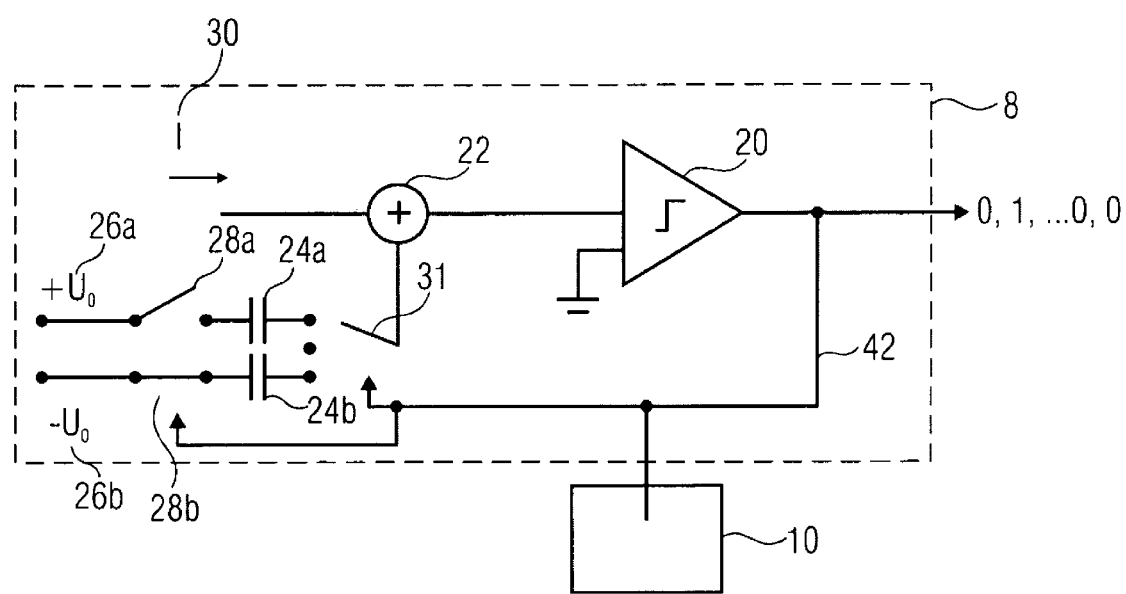

The example depicted in FIG. 2b is based on the fundamental reflections of the previous paragraphs, and shows a readout means 8 which comprises a digital signal generator 20, an adder 22, a first capacitance 24a, an identical second capacitance 24b as well as a positive reference voltage source 26a and a negative reference voltage source 26b identical in terms of magnitude. The digital signal generator 20 internally contains an integrator for integrating the input signal (the current present at the input) and a comparator which compares the integrated signal to "zero". What is to be determined is a current 30 flowing through a resistance bolometer. The positive reference voltage source 26a is connectable to the first capacitance 24a via a first switch 28a, and the negative reference voltage source 26b is connectable to the second capacitor 24b via a second switch 28b. The first capacitor 24a as well as the second capacitor 24b are connectable to a first input of the adder 22 via a third switch 31, the current 30 to be determined being present at the second input of said adder 22.

An output of the adder 22 is connected to an input of the digital signal generator 20, which compares the net current present at the output of the adder 22 to "zero", and outputs, depending on the comparison, a zero bit or a one bit per cycle of the delta-sigma arrangement at its output which is operated in a clocked manner. The bit current made available at the output of the digital signal generator 20 at the operating clock is processed further, on the one hand, as a readout result, and on the other hand serves to control the switches 28a, 28b and 31 such that if the current integrated within the digital signal generator 20 is larger than zero, negative charge packets will be switched to the adder 22. If the integrated current falls below 0 Coulomb, the digital signal generator 20 will switch over, i.e. will output a different bit at its output, which bit in turn will cause the switches 28a, 28b and 31 to switch over, so that from this moment onward, positive charges will be added to the current 30. This means that for each clock cycle, charge packets of constant absolute magnitudes are added to or subtracted from the current 28 to be determined, so that the net input current present at the input of the digital signal generator 20 amounts to 0 ampere on average.

By using the delta-sigma modulation principle, it is therefore possible, in a simple manner, to determine during the readout the overall charge flowing through the bolometer to be read out. Said overall charge corresponds to the product from the number of clock cycles during the readout and the charge which is added to the current 30 to be measured by one of the capacitors 24a or 24b for each clock cycle. As a result, the control means 10 which serves to determine the power supplied to the bolometer is connected to the digital output of the digital signal generator 20 and determines the sum of the signal 42 during a complete readout cycle. The electrical power consequently results as a product of the voltage applied during readout, of the sum of the output signal of the ADC, and of the amount of charge per clock cycle.

In the embodiment shown in FIG. 2b, the power supplied may thus be determined, in an efficient manner, using a control means 10, which need not comprise any expensive monitoring hardware or other hardware for monitoring analog magnitudes. On the one hand, one may determine the absolute power so as to be able to correct the measurement result in computational terms later on, if need be. On the other hand, it may also be assured, in an extremely simple manner, that identical power or energy is supplied to several bolometer elements to be read out, or to identical sensor elements for each readout cycle, so that the effects caused by the energy supplied, for example warming-up, will be identical in all of the sensor elements to be compared. For example when using a bolometer array, i.e. a matrix-shaped arrangement of bolometer elements, this allows to simply correct and subtract the global resistance change during post processing, which would be impossible if the individual pixels of the array individually undergo different changes in their measurement values.

With the combination of a delta-sigma modulator, shown in FIG. 2b, as the readout means 8, and with an associated control means 10 any identical power supplied for each bolometer element may be ensured in that the sum of the output signals used during the readout is identical for each element. Thus, an identical power supplied results for each element. For example, the number of measurement cycles may also be increased, even if in isolated cases, the actual measurement result could be determined with sufficient accuracy while using fewer measurement clocks.

In summary, the energy W supplied to a bolometer during a readout cycle consisting of n clocks may be determined in accordance with the following formula:

$$W = U \cdot \sum_{n=1}^{N} i_n \cdot q$$

Figure 3:
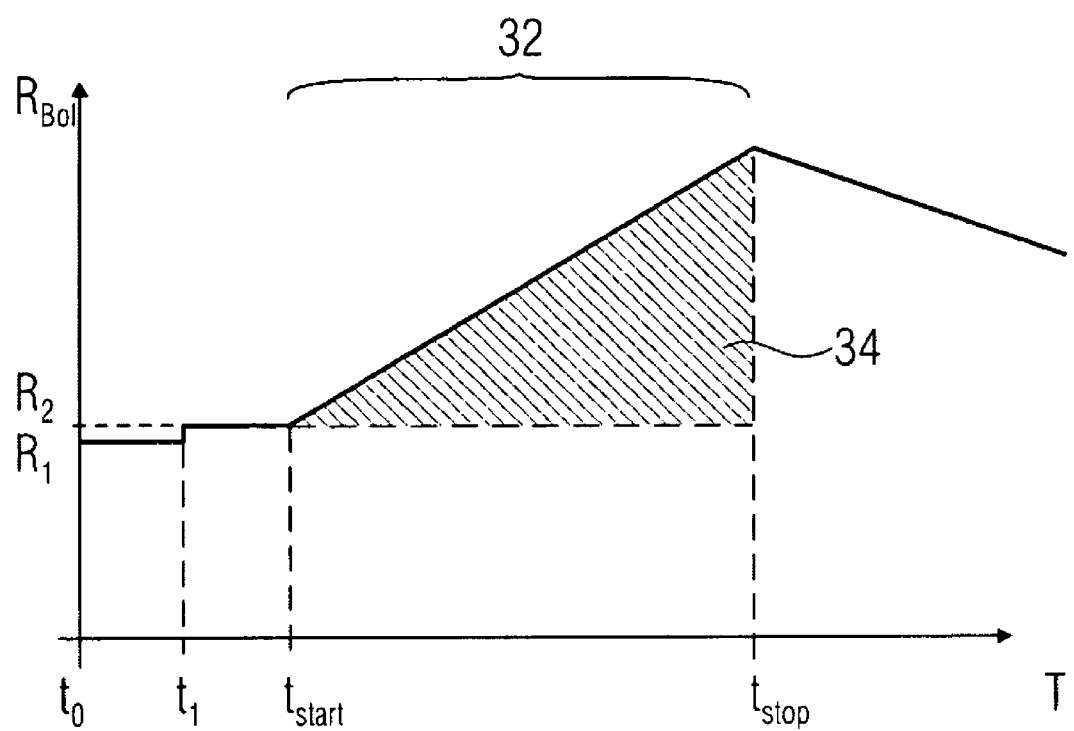
FIG. 3 shows an example of the resistance of a bolometer which changes during the readout.

W: energy supplied to the bolometer
U: voltage across the bolometer
N: number of cycles
$i_n$: number of the connected capacitors within the cycle n while taking the polarities into account
q: charge on the capacitor FIG. 3 illustrates, by way of example of a resistance bolometer, the problems associated with the readout of specific sensors or specific components, wherein the change in the measurement quantity of the sensor, said change being caused by a readout means because of the power supplied to the component, is larger than a change in the measurement quantity which is caused by the actual physical quantity to be measured. On the x-axis, FIG. 3 shows the time t in arbitrary units, and on the y-axis, the resistance $R_{Bol}$ through a resistance bolometer. Said resistance amounts to a predetermined value $R_1$ at a point in time $t_0$, said predetermined value $R_1$ corresponding to an output temperature of an object to be observed. If the temperature of the object to be observed increases at a point in time $t_1$, additional radiation energy is absorbed within the bolometer, with a latency which is neglected here, which results in an increase in the resistance $R_{Bol}$ of the bolometer to a value $R_2$, no readout of the bolometer being performed prior to a point in time $t_{Start}$, which means that the resistance value $R_2$ is consequently determined, or caused, only by the physical measurement quantity of the sensor which is to be determined.

At a point in time $t_{Start}$, measurement of the resistance value $R_2$ is commenced. If a change in the physical property of the sensor which is associated with the measurement quantity of the sensor (i.e. a change in the resistance of the resistance bolometer element) is caused by a power which is supplied by a readout means and which is larger than the maximum change in the physical property of the sensor which is caused by the physical measurement quantity to be determined, the behavior schematically depicted in FIG. 3 will result. Because of the power supplied to the component or the bolometer by the readout means during a measurement cycle which commences at a point in time $t_{Start}$ and ends at a point in time $t_{Stop}$, the resistance $R_{Bol}$ changes, during the measurement cycle 32, in a manner which is approximately linear with time. As can be seen from FIG. 3, the change caused by the power supplied to the bolometer by the readout means is larger than the change from the value $R_1$ to the value $R_2$, i.e. than a change caused by the physical measurement quantity to be determined by the sensor. By using embodiments of evaluation devices, however, the power supplied to the system may be determined, so that the resistance change caused in the bolometer because of the supply of power by the readout means, i.e. the area which is hatched in FIG. 3, may be corrected by the readout result so as to obtain a measurement value $R_2$ which is corrected with regard to this systematic effect.

As an alternative to the computational correction on account of the power supplied to the system, it may be ensured, if several sensors of an identical type are used, as was already described above, that the power supplied to the bolometers is identical for each bolometer element. In this case, the effect caused by the power supplied may be corrected, for example, by forming a difference between individual bolometer elements, since in this case the hatched area 34 is identical for all of the bolometer elements. A feedback of the evaluation device or the readout means to the sensor element may thus be successfully prevented. This enables a precise and efficient readout of sensors exhibiting transverse sensitivities, i.e. wherein the readout means or evaluation device immediately feeds back to the readout result determined by the sensor.

If a bolometer array or a plurality of bolometers is/are read out, the concept underlying some embodiments of the invention may be summarized as follows. The highly different resistances of the bolometers, which are due to production conditions, frequently result in different self-heating during readout. These different levels of self-heating make themselves felt as offset portions in the signal to be determined, as is shown, for example, by means of FIG. 3. If the self-heating is not detected by the readout circuit, offset matching operations may be performed again and again during operation.

When during resistance measurement the voltage across the sensor is held constant, the current flowing through the resistive element determines the level of self-heating, or the measurement value for the resistance of the bolometer element. In alternative embodiments, one may also impress a constant current and measure the voltage across the bolometer element at the same time. Alternatively, it is also possible to measure both the current and the voltage, provided that both quantities are variable. Using control means in accordance with some embodiments, the electrical power fed to the sensor or the component by the readout means may thus be specified, or determined. By varying the measurement time, the energy supplied may additionally be held constant for each measurement operation or for each complete measurement cycle. In some embodiments, with constant measurement time either the voltage or the current, or both the voltage and the current, is/are varied so as to keep constant the energy supply, or the energy fed to the system or the component, during the readout.

In some embodiments based on the delta-sigma modulation principle, self-heating, or the power supplied to a component, is very easy to detect in that the signal is summed up within the feedback path of the modulator. By summing up the switching operations, the current and, thus, the energy supplied to the sensor during the readout, may be calculated. The measurement quantity, which has been determined using the readout means, may be corrected with respect to the energy thus determined, or the power supply thus determined. Alternatively, measurement is terminated after a specified number of measurement cycles. In further embodiments, measurement may be terminated at the end of the same time duration in each case, and further cycles, which no longer belong to the actual measurement operation or to the measurement cycle, take place until the level of self-heating of all of the elements is the same. Thus, the energy supplied is the same for all of the sensors during a readout cycle.

In summary, by controlling the level of heating during the readout of sensors, or by controlling the power supplied to a sensor, said readout may be simplified. Any transverse sensitivities or feedbacks of the evaluation device which may exist due to a changing power dissipation during readout may be prevented. Alternatively, the power dissipation may also be detected and taken into account in the calculation of the useful signal.

Figure 4:
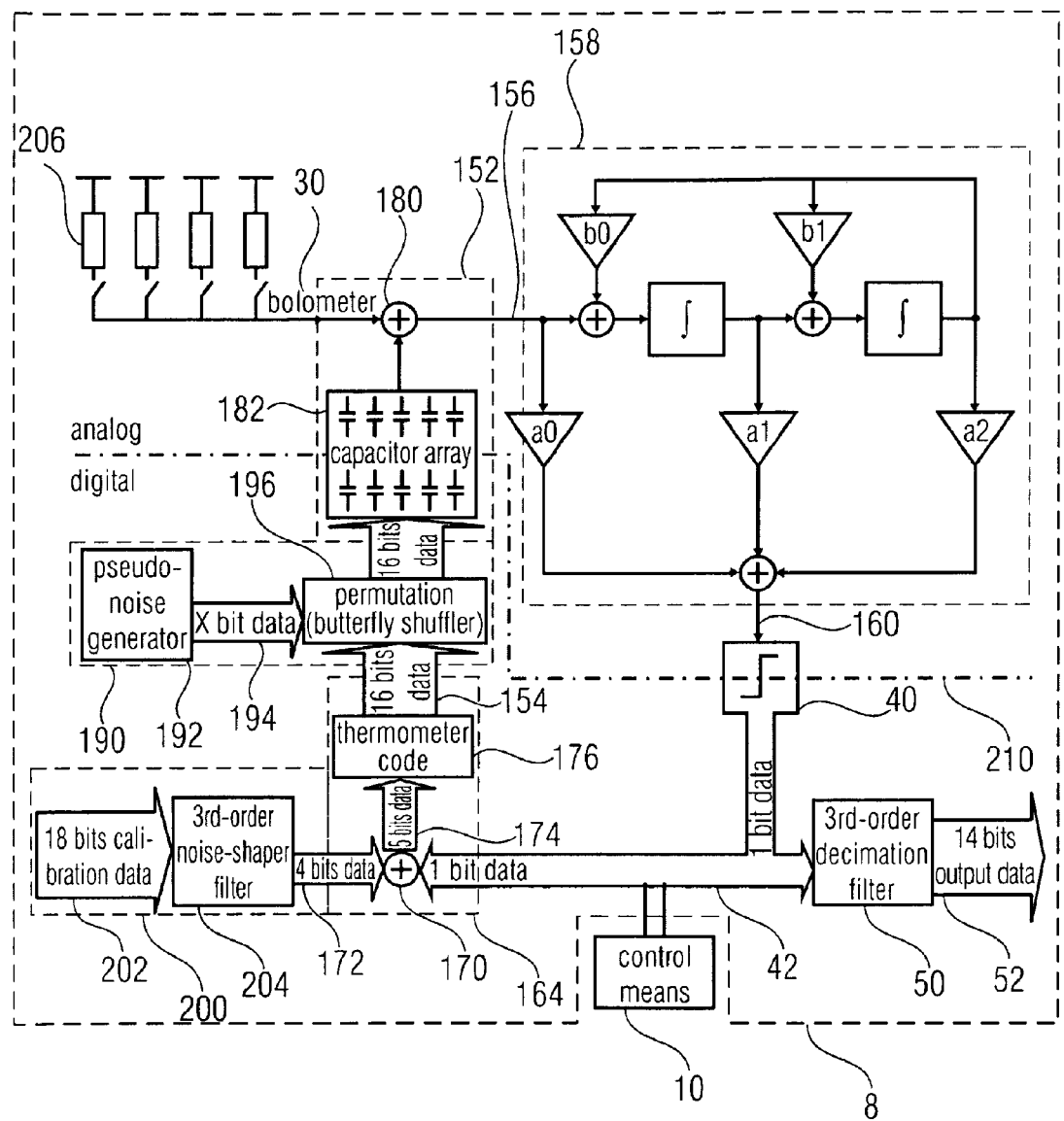
FIG. 4 shows a further embodiment of an evaluation device.

FIG. 4 shows an embodiment of an evaluation device which is particularly suited to read out signals comprising a high offset portion which may exceed the actual signal portion by more than one order of magnitude. Thus, it is suited, for example, to read out bolometers, or the current 30 flowing through a bolometer element. The evaluation device shown in FIG. 4 will be discussed below with reference to this example. Needless to say that the evaluation device is applicable to any other sensors without this fact needing to be indicated explicitly in the respective places.

In FIG. 4, as the measurement quantity, the bolometer current 30 is measured which, similarly to the case discussed in FIG. 2, has a correcting quantity applied to it by a compensation means, which in the case shown here comprises an adder 180 and a capacitor array 182, so as to correct the offset value, on the one hand, and to perform modulation in accordance with the delta-sigma modulation principle, on the other hand. The measurement quantity 156 which has the correcting quantity applied to it is integrated or filtered by an analog filter 158, which in this case is a second-order integrator, so as to apply a filtered measurement quantity 160 to the input of a one-bit analog/digital converter 40. The one-bit converter 40 generates a data stream of bits which are each 1 or −1, depending on whether the filtered measurement quantity 160 present at the input of the ADC 40 is larger or smaller than a reference value. A third-order decimation filter 50 serves to generate a digitized output signal 52 from the over-sampled one-bit signal of the analog/digital converter 40 by means of decimation.

The digital value or the digital output signal 42 of the ADC 40 is added to a digital calibration value 172 within a feedback loop 164 by means of an adder 170. In addition, the digital output signal 42 is supplied to the control means 10, which may determine a power supplied to the bolometer by observing the signal. In the case shown in FIG. 4, the digital output signal 42 has a resolution of 1 bit, and the digital calibration value 172 has a resolution of 4 bits. The adder 170 thus generates a five-bits data word 174, which is transformed to a thermometer code 176. The thermometer code represents the 16 potential values of five-bits data word 174 by 16 bits lined up, which may each be 0 or 1, the number of one bits corresponding to the number of the five-bits data word. The thermometer code 176 may be used directly as a combination signal to generate, by means of the compensation means 152, the correcting quantity which is dependent on the combination signal and which is added to the bolometer current 130 by means of the adder 180.

As was already mentioned, the compensation means 152 comprises a summation node, or an adder, 180 where the currents present are summed up, as well as a correction generator 182. The correction generator in turn consists of a capacitor array comprising 16 capacitors of nominally identical capacitances. The thermometer code 176 designates those capacitors whose charges are to be added so as to generate the correcting quantity which is added, at the summation node 180, to the analog measurement quantity 30, i.e. to the bolometer current. Each position of the 16-bits data word corresponds to a specific capacitor. If the bit of the respective location is 1, the capacitor will be used, if it is 0, the capacitor will not be used. The correcting quantity added to the analog measurement signal 30 thus contains both a portion which stems from a calibration, i.e. which describes an expected, stored quantity of a bolometer offset, and a portion stemming from the delta-sigma modulation principle.

In the case shown in FIG. 4, the compensation means 182 additionally comprises an optional random means 190, which, with an identical thermometer code 176, ensures that different combinations of capacitors of the capacitor array 182 are used in each case. To this end, on the bases of a random number 194 generated by a noise generator 192, a random permutation of the 16 bits of the thermometer code 176 is performed within a permutator 196, so that the measurement result is not distorted by any differences in capacitance of the nominally identical capacitors of the capacitor array 182, which differences are caused by variations in the parameters in the production of an integrated circuit. The feedback means 164 additionally comprises an optional provision means 200 so as to store and provide the calibration value 172. The provision means 200 comprises a memory for storing a predetermined calibration value 202 and a noise-shaper filter 204 for reducing the resolution of the stored predetermined calibration value 202. In the example depicted, the predetermined calibration value 202 is stored with a resolution of 18 bits, said calibration value 202 being reduced to a resolution of 4 bits by the noise-shaper filter 204, which 4-bits resolution may still be processed by the digital/analog converter, i.e. by the combination of the capacitor array 182 and the random means 190.

Just like in the case schematically depicted in FIG. 2, in FIG. 4 a bolometer to be read out has power supplied to it by the readout means 8. Said power may be determined by the control means 10 in a simple manner in that the number of clock cycles, or the data words associated with the clock cycles, and the calibration value 202 are known to the control means 10, so that same may determine the power supplied to the bolometer by the readout means 8.

Figure 5:
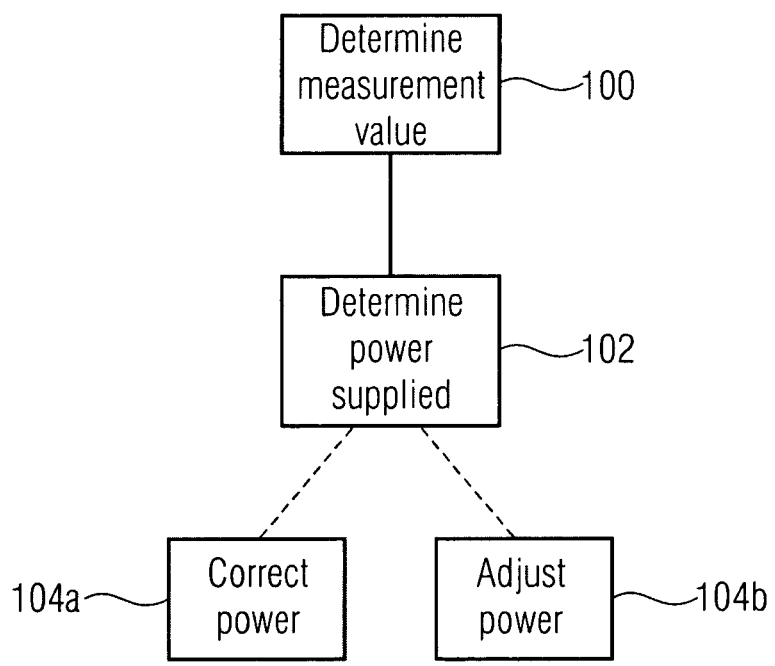
FIG. 5 shows an embodiment of a method of determining a measurement value.

FIG. 5 shows an embodiment of a method of determining a measurement value of a component.

In a readout step 100, the measurement value is determined while power is supplied to the component.

In a control step, the power supplied to the component during the readout is determined.

In a further, optional correction step 104b, the effects caused by the power supplied may be corrected.

In a further, alternative, optional adjustment step 104b, the power supplied may be influenced, on the basis of the power determined, such that it will correspond to a predetermined power value, which is identical for all of the readout operations.

Figure 6:
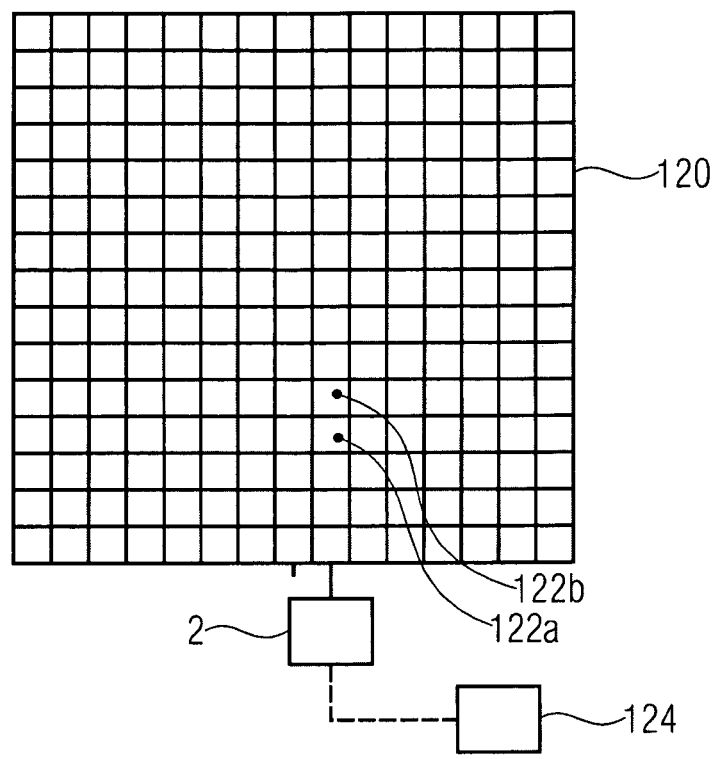
FIG. 6 shows an embodiment of a bolometer array comprising an evaluation device.

FIG. 6 shows an embodiment of a bolometer array 120 and of an evaluation device 2 associated therewith. The bolometer array 120 may consist, for example, of individual bolometer elements or micro bolometers arranged row by row and column by column (see, e.g., bolometer elements 122a and 122b). The two micro bolometers 122a and 122b, which have been drawn in by way of example, are arranged within a common column, which is read out by means of the evaluation device 2, or the readout means 8. The readout may be performed pixel by pixel, i.e. at first the bolometer element 122a is read out, then the bolometer element 122b is read out. Such a kind of readout is also common for CCD and CMOS sensors, for example. Needless to say that in further embodiments the bolometer array 120 may also consist of non-regular bolometer elements, or bolometer elements arranged in other geometric configurations.

Utilization of embodiments of evaluation devices 2 in connection with the multitude of bolometer elements within a bolometer array 120 has the advantage that row-by-row or column-by-column readout may be enabled, it being possible, at the same time, to compensate for the different levels of self-heating of the micro bolometers, or bolometer elements. In other methods of compensating for the self-heating, which are based, for example, on that the bolometer element to be read out is held in a thermal equilibrium state, this is not possible, since with said methods, such high levels of integration density cannot be achieved, in particular because each bolometer element to be read out may comprise its own readout circuit, which are calibrated independently of one another. In addition, the bolometer elements to be read out have power supplied to them continuously by means of such readout methods. Even if it were possible to provide each bolometer element with a readout circuit of its own, this would result, given the high levels of integration density of a bolometer array or a micro bolometer camera, in that said micro bolometer camera would heat up to a large extent, so that it may possibly destroy itself.

In addition, by using embodiments of inventive evaluation means 2 during readout of a bolometer array, one may achieve that the readout results of two adjacent pixels, or pixels being spaced at a small distance, may be used for taking into account the effect of the different levels of self-heating in that the corrected measurement values of the first bolometer element 122a and the second bolometer element 122b, which measurement values have been determined by the evaluation device, are combined so as to obtain a final measurement result on the basis of the two corrected measurement values. For this purpose, a comparison means 124 may optionally be coupled to the evaluation means 2 so as to determine the final measurement value in that the comparison means 124 combines a first corrected measurement value of the first bolometer element 122a and a second corrected measurement value of the second bolometer element 122b. The combination may consist in a subtraction of the two measurement values, for example. Of course, the combination may also be performed differently, for example any linear combinations or coefficients of the two measurement values may be combined in order to obtain the final readout result.

Figure 7:
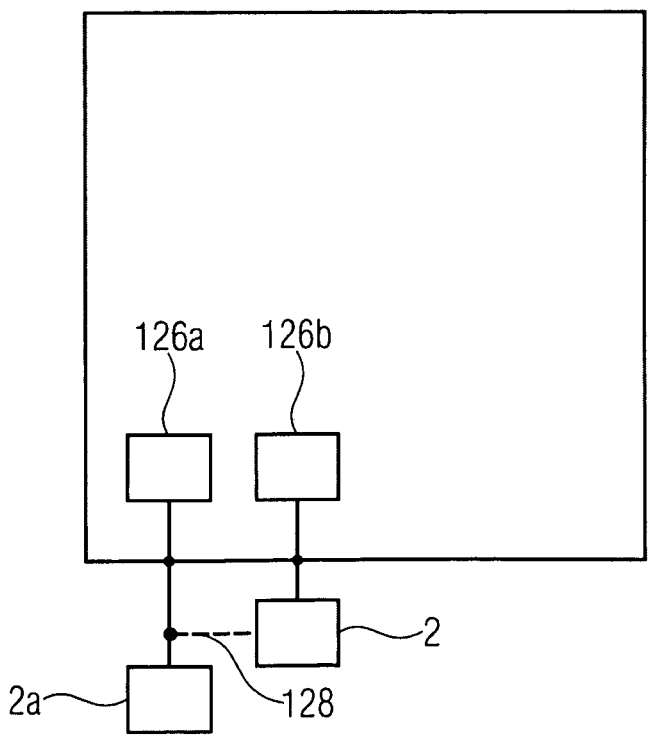
FIG. 7 shows an embodiment comprising 2 sensor elements and evaluation devices.

In the further embodiment shown in FIG. 7, a first sensor element 126a is connected to a first evaluation device 2a, and a second sensor element 126b is connected to a second evaluation device 2b. A final measurement value may be obtained when using embodiments of inventive evaluation devices, by combining corrected measurement values of individual sensor elements, even if the individual sensor elements are provided with different evaluation devices 2 and 2a. This is due to the fact that during the readout, the energy supplied to the respective sensor element is also determined, or in that care is taken to ensure that this energy is constant.

Alternatively, it is of course also possible, as is indicated in FIG. 7 by a dashed signal path 128, to perform the readout using one and the same evaluation device 2, in equivalence to the embodiment described in FIG. 6.

Even though in the embodiments described above, it was mainly the current flowing through a resistance bolometer that was used as an example of the readout of a measurement quantity, it is needless to say that further embodiments may evaluate other sensors, or may determine other measurement quantities, the advantages which result from the embodiments, or from the possibility of determining the power supplied, applying to said embodiments as well.

This may be, for example, reading out the current through a strain gage or a strain gage bridge. In addition, the systems that may be taken into consideration are not only electrically read-out or evaluated systems. Further embodiments of the invention may also determine the power which is mechanically supplied to a system, so as to be able to calculate the properties changed due to the mechanically supplied power, or so as to be able to repeat them in a reproducible manner.

For example, for a force measurement, the friction caused by a force-measuring means may be determined as the power supplied to the system, so as to be able to correct the measurement-value distortion caused by the friction.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An evaluation device for determining a measurement value of a component connected to the evaluation device, the component comprising a temperature-dependent resistance, comprising:
   a reader comprising a delta-sigma modulator configured to determine, using a delta-sigma modulation principle involving a number of clock cycles, while supplying, per clock cycle, a clock cycle power to the component, a measurement value measuring a resistance of a bolometer and to output the measurement value so that the measurement value is a measure of temperature; and
   a controller configured to determine a count of the number of clock cycles or a sum of a measure of the clock cycle power for each clock cycle so as to obtain an overall power supplied by the reader; and
   a compensator configured to correct the measurement value determined by the reader using the overall power in order to achieve a corrected measurement value which is freed from any effects caused by the overall power supplied, or control the reader so as to continue, in an energy cycle succeeding the clock cycles, to supply extra power to the component until the overall power plus the extra power equals a predetermined standard value.

2. The evaluation device as claimed in claim 1, wherein the power supplied by the reader is electrical power.

3. The evaluation device as claimed in claim 2, wherein
the reader is configured to determine the measurement value with a constant current flowing through the component; and
the controller is configured to determine the voltage present at the component.

4. The evaluation device as claimed in claim 2, wherein
the reader is configured to determine the measurement value with a variable current flowing through the component and with a variable voltage present at the component; and
the controller is configured to determine the variable voltage present at the component, and the variable current flowing through the component.

5. The evaluation device as claimed in claim 1, wherein
the reader is configured to determine the measurement value with a constant voltage present at the component; and
the controller is configured to determine a current supplied to the component by the reader.

6. The evaluation device as claimed in claim 1, wherein
the reader is configured to determine the measurement value with a constant current flowing through the component and with a constant voltage present at the component; and
the controller is configured to determine a time duration taken for determining the measurement value, so as to determine an energy supplied to the component during the determination of the measurement value.

7. The evaluation device as claimed in claim 1, wherein
the controller is configured to evaluate data within a feedback loop of the delta-sigma modulator so as to obtain the overall power.

8. The evaluation device as claimed in claim 7, wherein
the controller is configured to sum-up the data within the feedback loop so as to obtain the overall power.

9. The evaluation device as claimed in claim 1, wherein
the power supplied to a sensor by the reader causes a change in a temperature of the sensor which is associated with a measurement quantity of the sensor, said change being more than double a maximum change in a physical property of the sensor which is caused by a change in an environmental property to be measured.

10. The evaluation device of claim 1, wherein the reader and the compensator are configured such that the corrected measurement value depends on the measurement value in an increasing/decreasing direction contrary to a dependency of the corrected measurement value on the power supplied.

11. The evaluation device as claimed in claim 1, wherein the reader, the controller, and the corrector are configured to operate in read-out cycles so as to repetitively determine the measurement value.

12. A method of determining a measurement value at a component comprising a temperature-dependent resistance, comprising:
reading, using a delta-sigma modulation principle involving a number of clock cycles, while supplying, per clock cycle, a clock cycle power to the component, a measurement value measuring a resistance of a bolometer and output the measurement value so that the measurement value is a measure of temperature; and
determining a count of the number of clock cycles or a sum of a measure of the clock cycle power for each clock cycle so as to obtain an overall power supplied to the component during the readout; and
correcting the read-out measurement value using the overall power to achieve a corrected measurement value freed from any effects caused by the overall power supplied, or continuing, in an energy cycle succeeding the clock cycles, to supply extra power to the component until the overall power plus the extra power equals a predetermined standard value.

13. The method as claimed in claim 12, wherein electrical power is supplied.

14. The method device of claim 12, wherein the determination and correction are performed such that the corrected measurement value depends on the measurement value in an increasing/decreasing direction contrary to a dependency of the corrected measurement value on the power supplied.

15. A bolometer comprising:
a bolometer component comprising an electrical resistance which changes upon incidence of electromagnetic radiation; and
an evaluation device configured to determine a measurement value of the bolometer component, comprising:
a reader comprising a delta-sigma modulator configured to determine, using a delta-sigma modulation principle involving a number of clock cycles, while supplying, per clock cycle, a clock cycle power to the bolometer component, a measurement value measuring a resistance of the bolometer component and output the measurement value so that the measurement value is a measure for temperature change of the bolometer component due to the incidence of the electromagnetic radiation; and
a controller configured to determine a count of the number of clock cycles or a sum of a measure of the clock cycle power for each clock cycle so as to obtain an overall power supplied by the reader; and
a compensator configured to correct the measurement value determined by the reader using the overall power in order to achieve a corrected measurement value which is freed from any effects caused by the overall power supplied, or control the reader so as to continue, in an energy cycle succeeding the clock cycles, to supply extra power to the bolometer component until the overall power plus the extra power equals a predetermined standard value.

16. The bolometer as claimed in claim 15, wherein the reader is configured to determine, as the measurement value, the current flowing through the bolometer component with a constant voltage present at the bolometer component.

17. The bolometer as claimed in claim 15, additionally comprising:
a controller so as to correct a change in the electrical resistance of the bolometer component within the read-out measurement value, said change being caused by the power supplied, so as to achieve a corrected measurement value.

18. The bolometer as claimed in claim 15, additionally comprising:
a second bolometer component comprising an electrical resistance which changes upon incidence of electromagnetic radiation, the evaluator further being configured to determine, as the second measurement value, the resistance through the second bolometer component.

19. The bolometer as claimed in claim 18, additionally comprising:
a comparer configured to combine the first measurement value and the second measurement value so as to achieve a combined measurement value for the first bolometer component and the second bolometer component.

20. A bolometer system, comprising:
a first bolometer element comprising an electrical resistance which changes upon incidence of electromagnetic radiation;
a second bolometer element comprising an electrical resistance which changes upon incidence of electromagnetic radiation;
an evaluation device configured to determine the electrical resistances of the first bolometer element and of the second bolometer element, the evaluation device comprising:
a reader comprising a delta-sigma modulator configured to determine and output the electrical resistance while supplying power to the first bolometer element and to the second bolometer element so that the measurement value is a measure of temperature;
a controller for determining the power supplied by the reader by evaluating data within a feedback loop of the delta-sigma modulator; and
a compensator so as to correct the electrical resistances determined by the reader, using the power determined by the controller in order to achieve first and second corrected measurement values which are freed from any effects caused by the power supplied.

21. The bolometer system as claimed in claim 20, additionally comprising:
a comparer configured to combine the first corrected resistance and the second corrected resistance so as to achieve a final measurement value which represents temperatures of the first and second bolometer elements.

22. The bolometer system as claimed in claim 21, wherein the comparer is configured to subtract the first and second corrected resistances from each other.

23. An evaluation device for determining a measurement value of a component connected to the evaluation device, comprising:
a reader configured to determine and output the measurement value while supplying electrical power defined as electrical current flowing through the component times voltage across the component, to the component with keeping one of the current and the voltage constant and determining the measurement value from the other of the current and the voltage, the reader using a delta-sigma modulator for the determination of the measurement value; and
a controller configured to determine the power supplied by the reader by evaluating data within a feedback loop of the delta-sigma modulator; and
a compensator so as to correct the measurement value determined by the reader while using the power determined by the controller in order to achieve a corrected measurement value which is freed from any effects caused by the power supplied.

24. The evaluation device of claim 23, wherein the reader and the compensator are configured such that the corrected measurement value depends on the other of the current and the voltage in an increasing/decreasing direction contrary to a dependency of the corrected measurement value on the electrical power supplied.

25. A method for determining a measurement value of a component connected to the evaluation device, comprising:
determining, using a delta-signal modulator, the measurement value while supplying electrical power defined as electrical current flowing through the component times voltage across the component, to the component with keeping one of the current and the voltage constant and determining and outputting the measurement value from the other of the current and the voltage so that the measurement value is a measure of temperature; and
determining the power supplied by the reader by evaluating data within a feedback loop of the delta-sigma modulator; and
correcting the measurement value determined by the reader while using the power determined in order to achieve a corrected measurement value which is freed from any effects caused by the power supplied.

26. The method of claim 25, wherein the determination and correction are performed such that the corrected measurement value depends on the other of the current and the voltage in an increasing/decreasing direction contrary to a dependency of the corrected measurement value on the electrical power supplied.

* * * * *